United States Patent
Kundu et al.

(10) Patent No.: US 9,231,970 B2
(45) Date of Patent: *Jan. 5, 2016

(54) SECURITY-AWARE ADMISSION CONTROL OF REQUESTS IN A DISTRIBUTED SYSTEM

(71) Applicant: International Business Machines Corporation, Armonk, NY (US)

(72) Inventors: Ashish Kundu, Elmsford, NY (US); Ajay Mohindra, Yorktown Heights, NY (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/790,040

(22) Filed: Mar. 8, 2013

(65) Prior Publication Data

US 2014/0259089 A1 Sep. 11, 2014

(51) Int. Cl.
*G06F 21/55* (2013.01)
*H04L 29/06* (2006.01)
*G06F 21/62* (2013.01)
*G06F 21/60* (2013.01)

(52) U.S. Cl.
CPC .......... *H04L 63/1441* (2013.01); *G06F 21/604* (2013.01); *G06F 21/6218* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 7,389,354 B1* | 6/2008 | Sitaraman et al. | 709/229 |
| 8,195,876 B2 | 6/2012 | Van Hise et al. | |
| 2004/0193892 A1* | 9/2004 | Tamura et al. | 713/182 |
| 2006/0123479 A1* | 6/2006 | Kumar et al. | 726/23 |
| 2007/0021125 A1 | 1/2007 | Zhu et al. | |
| 2007/0022474 A1* | 1/2007 | Rowett et al. | 726/11 |
| 2008/0019274 A1* | 1/2008 | Droux et al. | 370/235 |
| 2008/0175226 A1 | 7/2008 | Alperovitch et al. | |
| 2010/0017883 A1 | 1/2010 | Wang et al. | |
| 2010/0082513 A1* | 4/2010 | Liu | 706/46 |
| 2010/0103837 A1* | 4/2010 | Jungck et al. | 370/252 |
| 2010/0262650 A1* | 10/2010 | Chauhan et al. | 709/203 |
| 2013/0055343 A1* | 2/2013 | de los Reyes et al. | 726/1 |

* cited by examiner

*Primary Examiner* — Jung Kim
*Assistant Examiner* — Adrian Stoica
(74) *Attorney, Agent, or Firm* — Ryan, Mason & Lewis, LLP (57) ABSTRACT

Techniques for security-aware admission control of requests in a distributed system. A method includes identifying a request dropped by a first application component in a distributed system, determining one or more actions to take with respect to the dropped request, said determining comprises identifying one or more policies of the first application component responsible for the dropped request and identifying one or more additional application components in the distributed system to be affected based on the identified one or more policies, and executing said one or more actions to control admission of one or more requests associated with the dropped request at the one or more additional application components.

15 Claims, 5 Drawing Sheets

SECURITY-AWARE ADMISSION CONTROL OF REQUESTS IN A DISTRIBUTED SYSTEM

FIELD OF THE INVENTION

Embodiments of the invention generally relate to information technology, and, more particularly, to distributed application management.

BACKGROUND

Many distributed applications hosted on the cloud or other infrastructures include multiple tiers. Such applications often employ distributed security policies at each component or tier so as to carry out security-related actions such as authorize incoming requests, detect intrusion, filter out data that may lead to command injection attacks or system state corruption, etc. Example policies include distributed firewall policies, distributed access control policies, and distributed database policies.

Accordingly, when a distributed application is architected and deployed, the associated policies are authored and deployed either as part of a larger top-level application-wide policy (that is, top-down decomposition of policies) or as part of an aggregation of independently authored security policies of individual components/tiers. Additionally, distributed policies for a single distributed application should be consistent and coherent in the security semantics to be implemented. However, challenges exist because some policies may remain inconsistent with other policies from the beginning of deployment or may become inconsistent as components evolve and/or are updated. Moreover, conflicts between policies can lead to conflicting admission control decisions regarding requests, which can lead to incomplete processing of requests and the potential to drop requests prematurely.

Consequently, a need exists to prevent admission of requests that are likely to be dropped at a later processing stage due to conflicting security policies deployed for different components of an application.

SUMMARY

In one aspect of the present invention, techniques for security-aware admission control of requests in a distributed system are provided. An exemplary computer-implemented method can include steps of identifying a request dropped by a first application component in a distributed system, and determining one or more actions to take with respect to the dropped request, said determining comprises identifying one or more policies of the first application component responsible for the dropped request and identifying one or more additional application components in the distributed system to be affected based on the identified one or more policies. The method also includes executing said one or more actions to control admission of one or more requests associated with the dropped request at the one or more additional application components.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps.

Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of one or more embodiments of the present invention will become apparent from the following detailed description of illustrative embodiments thereof, which is to be read in connection with the accompanying drawings.

DETAILED DESCRIPTION

As described herein, an aspect of the present invention includes security-aware admission control of requests in a distributed system. At least one embodiment of the invention includes detecting and dropping or throttling requests that are likely to be dropped at a subsequent tier. By way merely of example, a request might include a user interacting with a web-based application, resulting in forms being submitted, data being requested, and web pages being displayed. Security policies that are set to be modified and/or updated prior to one or more implications or effects are detected, and proactive action is taken in controlling admission of associated requests until the relevant security policies have been found to be consistent.

In determining that policies are consistent, at least one embodiment of the invention includes obtaining system and/or manual input that informs the admission control system as to policy consistency. The information included in such input can include, for example, one or more pieces of request type, application name, source internet protocol (IP) address, user name, etc. An example policy can be, for example, to deny a request for an application from specific user or IP address.

As noted herein, a distributed application (DA) can be created, composed and/or aggregated from multiple component applications that are deployed as part of a topology such as a multi-tier architecture. By way of example, let DA be a distributed application and let $S_1, S_2, \ldots, S_n$ be the components in DA deployed using a specific topology. Additionally, let $SEC(S_i)$ represent a security component that enforces security policies for component $S_i$.

In this illustrative example, a request R from a client C is dropped at a service $S_i$ because the $SEC(S_i)$ did not authorize admission of the request to $S_i$. $SEC(S_i)$ stores the session attributes and credentials of R, and the reason for which R was not authorized. The reason can include, for example, a lack of credentials, values of parameters that may lead to overflow of buffers, inputs that may inject malicious code (such as scripts, structured query language (SQL) query, etc.), mode of disk operating system (DoS) avoidance, potential intrusion, and/or parameters of R contribute to the detection of potential security violation by R.

Further, by way of illustration, let $Th(C, R, SEC(S_i))$ be a threshold value, which is one or more, which represents the number of such request drops permitted before $SEC(S_i)$ notifies another security component $SEC(S_j)$ or SEC' to drop, throttle and/or divert requests of type R from client C. This notice to drop, throttle and/or divert is also referred to herein as "DISALLOW(R, C, $S_i$, INFO)." SEC' denotes a designated security component that is capable of receiving and processing such notifications appropriately, or forwarding such notifications to some other security component. $SEC(S_j)$ is a security component for a service $S_j$, which is a designated source of requests of type R from client C, and which are sent to $S_i$. As part of such a notification, $SEC(S_i)$ includes a set INFO(C, R, $SEC(S_i)$) containing the parameters, values and reason(s) for which R was dropped. INFO( ), in this instance, contains values that can only be shared with $SEC(S_j)$. For example, the password information for $SEC(S_i)$ cannot be shared with $SEC(S_j)$, and such information is not included in INFO( ). A notification from $SEC(S_i)$ may also be triggered by output of certain security related analytics from a component and/or service that analyzes policies and detects conflicts.

Upon receiving the notification, $SEC(S_j)$ or SEC' processes the notification and determines whether to forward (or divert) requests of type R from C to another replica of $S_i$ (especially in the case of DoS on $S_j$), to drop the request, or to queue (that is, throttle) the request for future processing. As part of such processing, $SEC(S_j)$ or SEC' may also notify $SEC(S_k)$ (and/or SEC"), which may be a source of requests of type R to $S_j$. This is referred to herein as propagation of DISALLOW. Subsequently, if $SEC(S_i)$ determines (or is configured such) that requests of type R from C can be allowed in an authorized manner, $SEC(S_i)$ stores this event and notifies all $SEC(S_j)$ and SEC' to which it had sent earlier drop, throttle and/or divert requests of type R from C. Such a notification is also referred to herein as "ALLOW(R, C, $S_i$, INFO)."

Upon receiving a notification ALLOW from $SEC(S_i)$ for R from C, $SEC(S_j)$ and/or SEC' processes the notification and begins allowing requests of type R from C starting with any throttled and/or persistently queued requests. Additionally, $SEC(S_j)$ and/or SEC' notify, with ALLOW, other security components such as $SEC(S_k)$ that were notified by $S_j$ as part of a prior propagation of DISALLOW. Accordingly, this is also referred to herein as a propagation of ALLOW.

Figure 1:
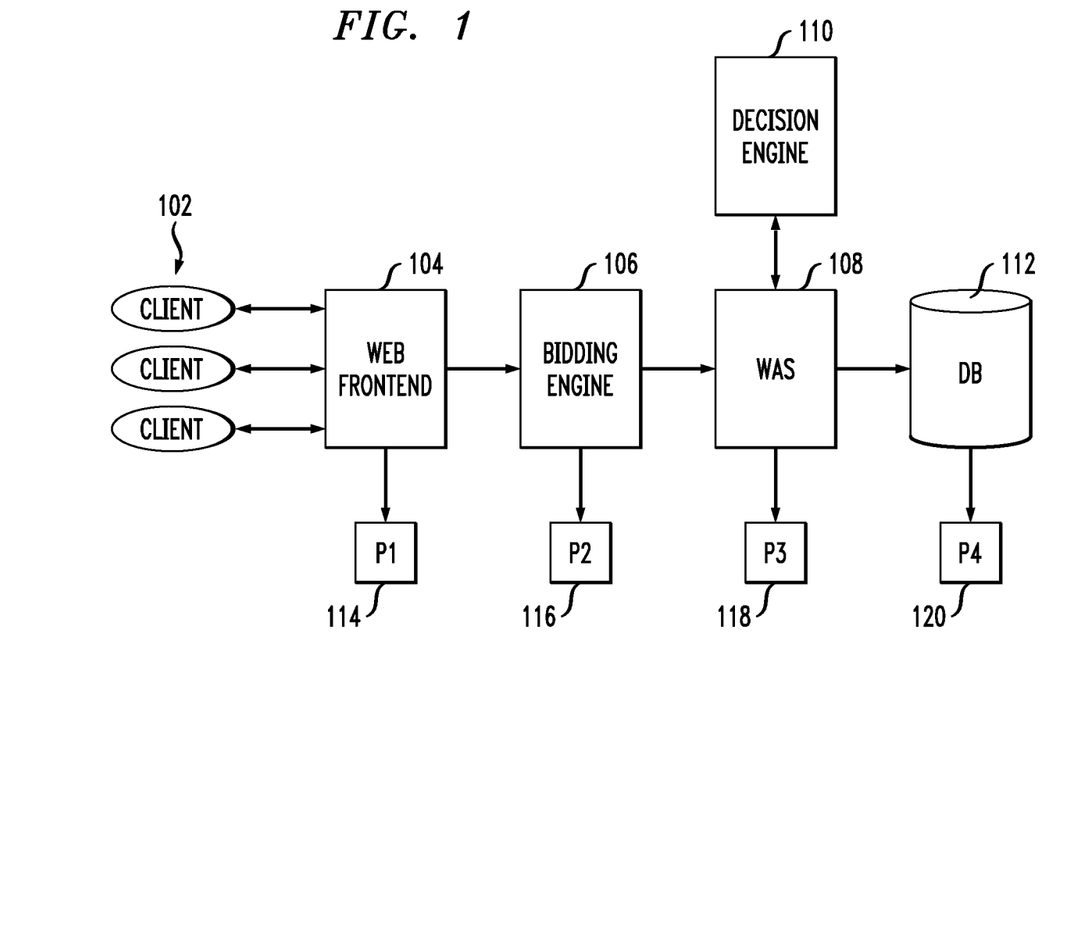
FIG. 1 is a diagram illustrating an example application of an embodiment of the present invention.

FIG. 1 is a diagram illustrating an example application of an embodiment of the present invention. By way of illustration, FIG. 1 depicts clients 102, a web front-end component 104 (which interacts with clients 102), a bidding engine 106, a Websphere Application Server (WAS) component 108, a decision engine 110 and a database (DB) 112. FIG. 1 additionally depicts four policies (P1-P4), identified as elements 114, 116, 118 and 120, respectively, in FIG. 1. By way of example, P1 (114) can permit access to users with a username and password from 6:00 am-6:00 pm, P2 (116) can permit access to users with a username and password from 8:00 am-5:00 pm, P3 (118) can permit access to users from 9.2.*.* internet protocol (IP) addresses, while P4 (120) can permit authorized users to access certain tables.

By way of illustration, consider the following example sequence in connection with FIG. 1. An administrator (admin) of DB 112 detects a SQL injection attack. Accordingly, the DB admin updates a DB policy so that P4 (120) does not allow requests with SQL queries containing wildcards. As a result, requests from WAS 108 to DB 112 are dropped. If requests are dropped between WAS 108 and DB 112 due to a full queue, P4 (120) is updated to allow only 1≤N≤5 concurrent requests.

Also, for example, if the password for WAS admin expires between WAS 108 and the decision engine 110, requests are dropped between the bidding engine 106 and WAS 108. Further, if requests are dropped between WAS 108 and DB 112, resources used for partial processing are wasted, there is a roll-back of effects and/or states due to partial processing, and the quality of service (QoS) of other requests may be influenced adversely (for example, additional requests may have been dropped and/or throttled).

As detailed herein, at least one embodiment of the invention include determining whether a request drop is due to an issue with one or more security policies. By way of illustration, consider the following. Let components of a distributed service be $C_1 \ldots C_n$. A request R from $C_i$ to $C_j$ is not successfully processed, and a response (Res) is returned: $C_j \rightarrow C_i$: Res. If the response contains information that $C_j$ found credentials missing and/or in error, or $C_j$ cannot admit the request R because of a security policy, then the drop is deemed as due to a security issue.

Otherwise, if the response contains information that R was not processed because of non-security reasons (such as load, for example,) at least one embodiment of the invention includes co-relating monitoring information, if any, wherein information collected at one stage is correlated with information being collected at other stages. By way of example, typical monitoring information can include the load at a server, disk utilization, memory utilization, source IP address of the request, and user credentials. If monitoring information states $C_j$, or a service required by $C_j$, is too highly loaded, then the reason for the request drop is a non-security issue.

If, however, the response does not contain any information about why R was dropped, at least one embodiment of the invention can include processing the following steps. If there is an availability issue with the network path from $C_i$ to $C_j$ or a capacity issue on Cj, then R may have been dropped due to that reason. If there is no such availability issue, at least one embodiment of the invention further includes analyzing the security policies of the relevant components. If there is an inconsistency between the policies that control security of $C_i$ and $C_j$ directly or indirectly, and if all requests received from $C_i$ at $C_j$ that are subjected to these policies have been dropped because of the change of some or all of these policies, it can be determined that R has been dropped due to this inconsistency.

One or more embodiments of the invention additionally include determining specific issues. Accordingly, the security policies and logs of relevant operating system, middleware, and/or application components can be analyzed, for example, to answer the following queries. One query includes determining if the credential information used by $C_i$ is the same credential information $C_j$. If no (that is, the credential information is not the same), then a determination can be made that $C_j$ dropped R due to invalid credentials. Another query includes determining if the credential information used by R to use the service of $C_j$ (for example, $C_i$ is db2 client, $C_j$ is DB2) has expired or been revoked. If yes, then a determination can be made that $C_j$ dropped R due to invalid credentials. Yet another query includes determining if the session to which R refers is valid or has the correct set of privileges so that $C_j$ can process R. If no (that is, the session in invalid and/or does not have the correct set of privileges), then a determination can be made that $C_j$ dropped R due to an invalid session or a lack of privileges (even if the credentials were correct).

Another query includes determining if $C_j$ received too many requests similar to R from the same internet protocol (IP) domain and/or credentials sent within a pre-determined time period. Also such a query also includes determining if $C_j$ allowed some of these request and dropped all of a number of subsequent requests (that is, R belongs to this group of subsequent requests). If this query can be answered in the affirmative, then a determination can be made that $C_j$ is using a DoS-avoidance policy, which led to the dropping of R. Additionally, yet another query includes determining if the security policy of $C_j$, any of the security policies that are on the control flow path of $C_i$ and $C_j$, or any of the security policies that are used by $C_j$ have been recently changed or altered. If yes (that is, relevant policies have been recently changed), then a determination can be made that R was dropped due to such a change. If no (that is, none of the relevant policies have been recently changed), but if the policies for $C_i$ have been changed, then a determination can be made that R was dropped due to that change.

Figure 2:
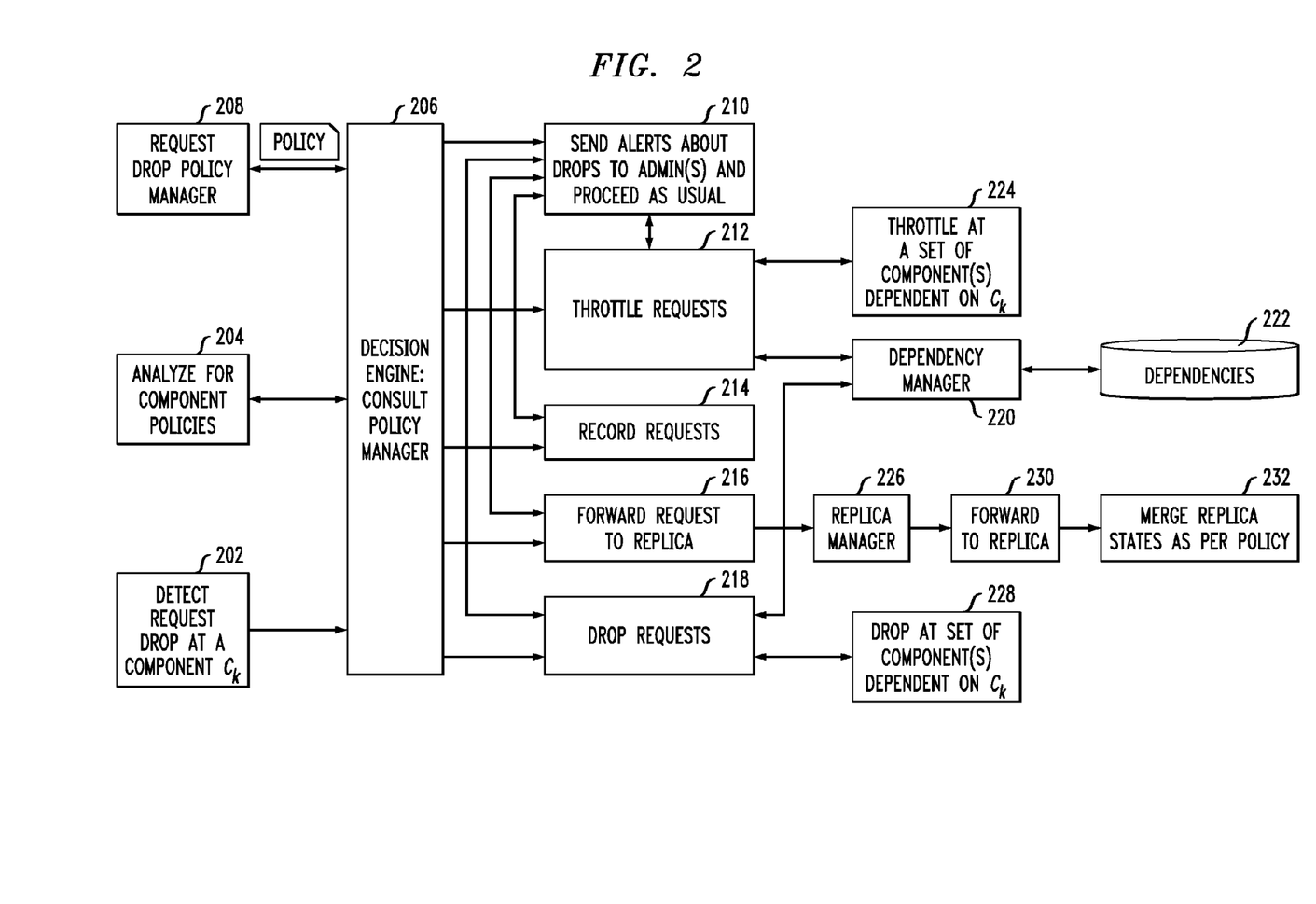
FIG. 2 is a diagram illustrating admission control of requests, according to an embodiment of the present invention.

FIG. 2 is a diagram illustrating admission control of requests, according to an embodiment of the present invention. Step 202 includes detecting a request drop at a component $C_k$. Step 204 includes analyzing for component policies and step 206 includes consulting a policy manager via a decision engine. Component policies include rules that govern whether a specific request should flow to the next stage. Additionally, step 208 includes interacting with the decision engine to determine the policy or rule responsible for the request drop.

Step 210 includes sending one or more alerts to one or more administrators (admins) pertaining to a request drop, a request forwarding, a request recording and/or a throttling of a request, and otherwise proceeding as usual. Elements 212, 214, 216 and 218 include instructions for actions per a decision from the decision engine (via step 206). Element 212 includes an instruction for throttling one or more requests. An example in this context might include, for instance, reducing the rate at which application requests are being forwarded to the next stage in the application architecture. Element 214 includes an instruction for recording the requests, element 216 includes an instruction for forwarding the requests to a replica, and element 218 includes an instruction for dropping the requests. As used herein, a replica refers to a duplicate set of servers that contain the application logic, and the corresponding technique detailed above is used to tolerate failures of servers.

In step 220, a dependency manager interacts with a dependencies database 222 in response to the throttling instruction 212 and the drop instruction 218. As described herein, a dependency manager maintains state regarding how different requests are related to each other in context of the application and servers being monitored. Additionally, in response to the throttling instruction 212, step 224 includes throttling the requests at a set of component(s) dependent on $C_k$. In an example embodiment of the invention, the set of components are manually determined by the system administrator based on application characteristics. Responsive to the forwarding instructions 216, a replica manager 226 ultimately forwards the requests to a replica in step 230, and replica states are merged in step 232 as per the relevant policy, wherein the two sets of results generated by performing the same operation against two sets of servers are merged to create a "single" result. This step ensures transactional consistency of the operation. Also, in response to the drop instruction 218, step 228 includes dropping the requests at a set of components dependent on $C_k$.

Figure 3:
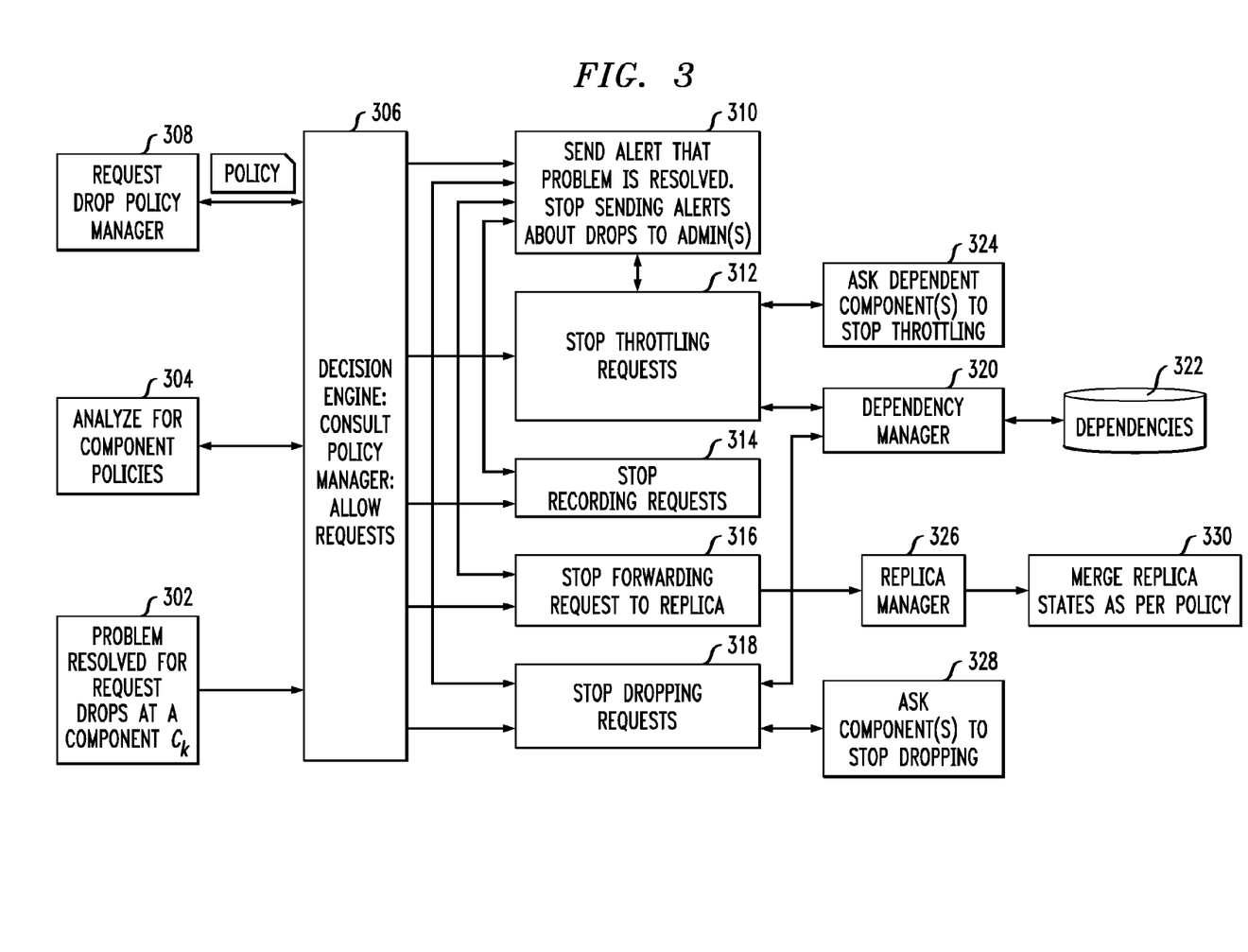
FIG. 3 is a diagram illustrating post-resolution of issue resulting in request drops, according to an embodiment of the invention.

FIG. 3 is a diagram illustrating post-resolution of issue resulting in request drops, according to an embodiment of the invention. Step 302 includes resolving a problem pertaining to request drops at a component $C_k$. By way of example, an instance of problem resolution might include fixing the security credentials at a server so that the request can flow through. Another example of resolution can include restarting a server sub-system that is resulting in dropped requests. Step 304 includes analyzing for component policies and step 306 includes consulting a policy manager, via a decision engine, to allow requests. Additionally, step 308 includes interacting with the decision engine to determine the policy responsible for the request drop.

Step 310 includes sending one or more alerts to one or more admins that the problem has been resolved. Such a step additionally includes stopping the sending of alerts to admins pertaining to a request drop, a request forwarding, a request recording and/or a throttling of a request. Elements 312, 314, 316 and 318 include instructions to stop actions per a decision from the decision engine (via step 306). Element 312 includes an instruction to stop throttling one or more requests. Element 314 includes an instruction to stop recording the requests, element 316 includes an instruction to stop forwarding the requests to a replica, and element 218 includes an instruction to stop dropping the requests.

In step 320, a dependency manager interacts with a dependencies database 322 in response to the instruction to stop throttling requests 312 and the instruction to stop dropping requests 318. Additionally, in response to the instruction to stop throttling requests 312, step 324 includes asking component(s) dependent on $C_k$ to stop throttling the requests. Responsive to the instruction to stop forwarding the requests 316, a replica manager 326 merges replica states in step 330 as per the relevant policy. Also, in response to the instruction to stop dropping requests 318, step 328 includes asking component(s) dependent on $C_k$ to stop dropping the requests.

Figure 4:
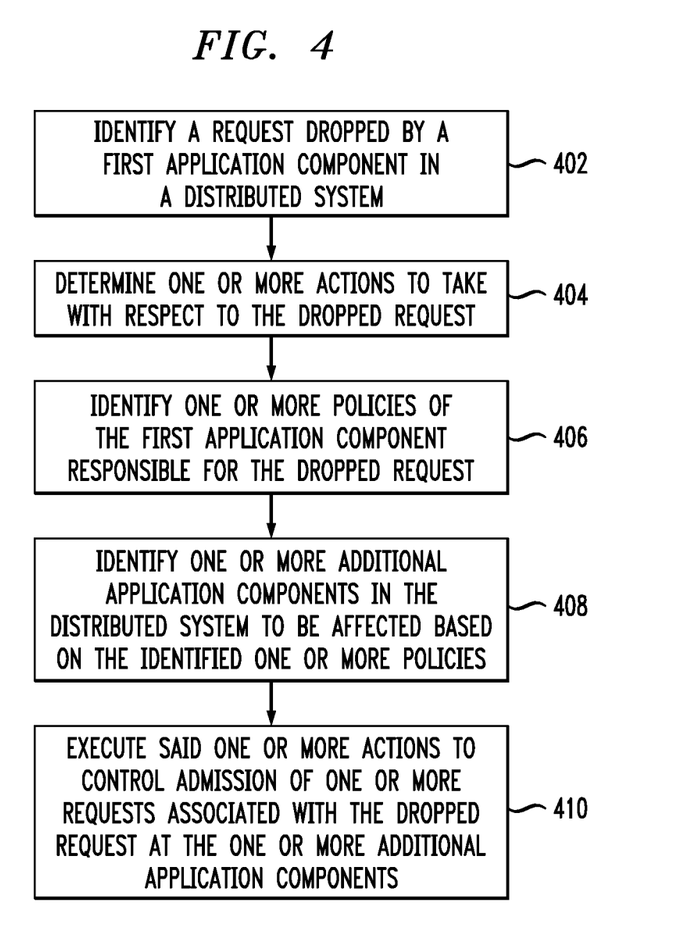
FIG. 4 is a flow diagram illustrating techniques according to an embodiment of the invention.

FIG. 4 is a flow diagram illustrating techniques according to an embodiment of the invention. Step 402 includes identifying a request dropped by a first application component in a distributed system. Step 404 includes determining one or more actions to take with respect to the dropped request. The actions can include recording the one or more requests associated with the dropped request, throttling the one or more requests associated with the dropped request, dropping the one or more requests associated with the dropped request, and/or forwarding the one or more requests associated with the dropped request to a replica.

Additionally, step 404 includes the actions of step 406 and 408. Step 406 includes identifying one or more policies of the first application component responsible for the dropped request. Step 408 includes identifying one or more additional application components in the distributed system to be affected based on the identified one or more policies. Also, the determining step can include determining if credential information used by the first application component is the same credential information for the one or more additional application components. Additionally, the determining step can include determining if credential information used by the dropped request to utilize a service of the first application component has expired and/or been revoked. The determining step can also include determining if a session to which the dropped request refers is valid, as well as determining if the one or more policies of the one or more additional application components have been altered. Further, the determining step can include determining if the one or more additional application components have received a pre-determined number of requests similar to the dropped request within a pre-determined time period.

Step 410 includes executing said one or more actions to control admission of one or more requests associated with the dropped request at the one or more additional application components. The executing step can include executing the one or more actions until the policies responsible for the dropped request are determined to be consistent across the first application component and the one or more additional application components.

The techniques depicted in FIG. 4 can also include generating one or more alerts to one or more system administrators pertaining to the execution of the one or more actions. Additionally, at least one embodiment of the invention includes storing one or more session attributes and one or more credentials of the dropped request, as well as storing a reason for which the dropped request was not authorized. Such reasons can include, for example, a lack of credentials, a value of one or more parameters that leads to an overflow of a buffer, an input that injects malicious code, and/or a parameter of the request that contributes to detection of a potential security violation.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer usable program code that is stored in a computer readable storage medium in a data processing system, and wherein the computer usable program code was downloaded over a network from a remote data processing system. Also, in an aspect of the invention, the computer program product can include computer usable program code that is stored in a computer readable storage medium in a server data processing system, and wherein the computer usable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
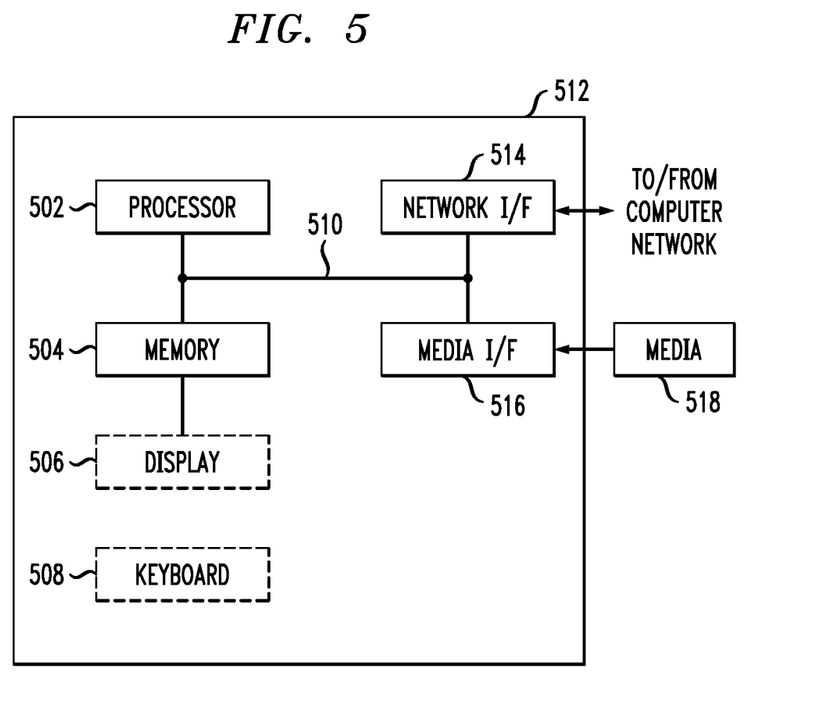
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk; C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, detecting and dropping or throttling requests that are likely to be dropped at a subsequent tier.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    identifying a request dropped by a first application component in a distributed system;
    determining one or more actions to take with respect to the dropped request, said determining comprises:
        identifying one or more policies of the first application component responsible for the dropped request; and
        identifying one or more additional application components in the distributed system to be affected based on the identified one or more policies;
    executing, at each of the one or more additional application components, a distinct one of said one or more actions to temporarily preclude admission of all requests of a given type associated with the dropped request at each of the one or more additional application components subsequent to a predetermined number of multiple instances of the request dropped by the first application;
    enacting a change to the identified one or more policies of the first application component, wherein the change renders the request dropped by the first application component allowable by the first application component; and
    transmitting a notification to the one or more additional application components to allow admission of one or more requests associated with the dropped request;
    wherein at least one of the steps is carried out by a computer device.

2. The method of claim 1, wherein said executing said one or more actions comprises executing said one or more actions until the one or more policies responsible for the dropped request are determined to be consistent across the first application component and the one or more additional application components.

3. The method of claim 1, wherein said one or more actions comprise recording the one or more requests associated with the dropped request.

4. The method of claim 1, wherein said one or more actions comprise throttling the one or more requests associated with the dropped request.

5. The method of claim 1, wherein said one or more actions comprise dropping the one or more requests associated with the dropped request.

6. The method of claim 1, wherein said one or more actions comprise forwarding the one or more requests associated with the dropped request to a replica of the first application component.

7. The method of claim 1, wherein said determining one or more actions to take comprises determining if credential information used by the first application component is the same credential information for the one or more additional application components.

8. The method of claim 1, wherein said deter lining one or more actions to take comprises determining if credential information used by the dropped request to utilize a service of the first application component has expired and/or been revoked.

9. The method of claim 1, wherein said determining one or more actions to take comprises determining if a session to which the dropped request refers is valid.

10. The method of claim 1, wherein said determining one or more actions to take comprises determining if the one or more additional application components have received a predetermined number of requests similar to the dropped request within a pre-determined time period.

11. The method of claim 1, wherein said determining one or more actions to take comprises determining if the one or more policies of the one or more additional application components have been altered.

12. The method of claim 1, comprising:
    generating one or more alerts to one or more system administrators pertaining to the execution of the one or more actions.

13. The method of claim 1, comprising:
    storing one or more session attributes and one or more credentials of the dropped request.

14. The method of claim 1, comprising:
    storing a reason for which the dropped request was not authorized.

15. The method of claim 14, wherein said reason comprises one or more of a lack of credentials, a value of one or more parameters that leads to an overflow of a buffer, an input that injects malicious code, and/or a parameter of the request that contributes to detection of a potential security violation.

* * * * *